Patented Sept. 3, 1935

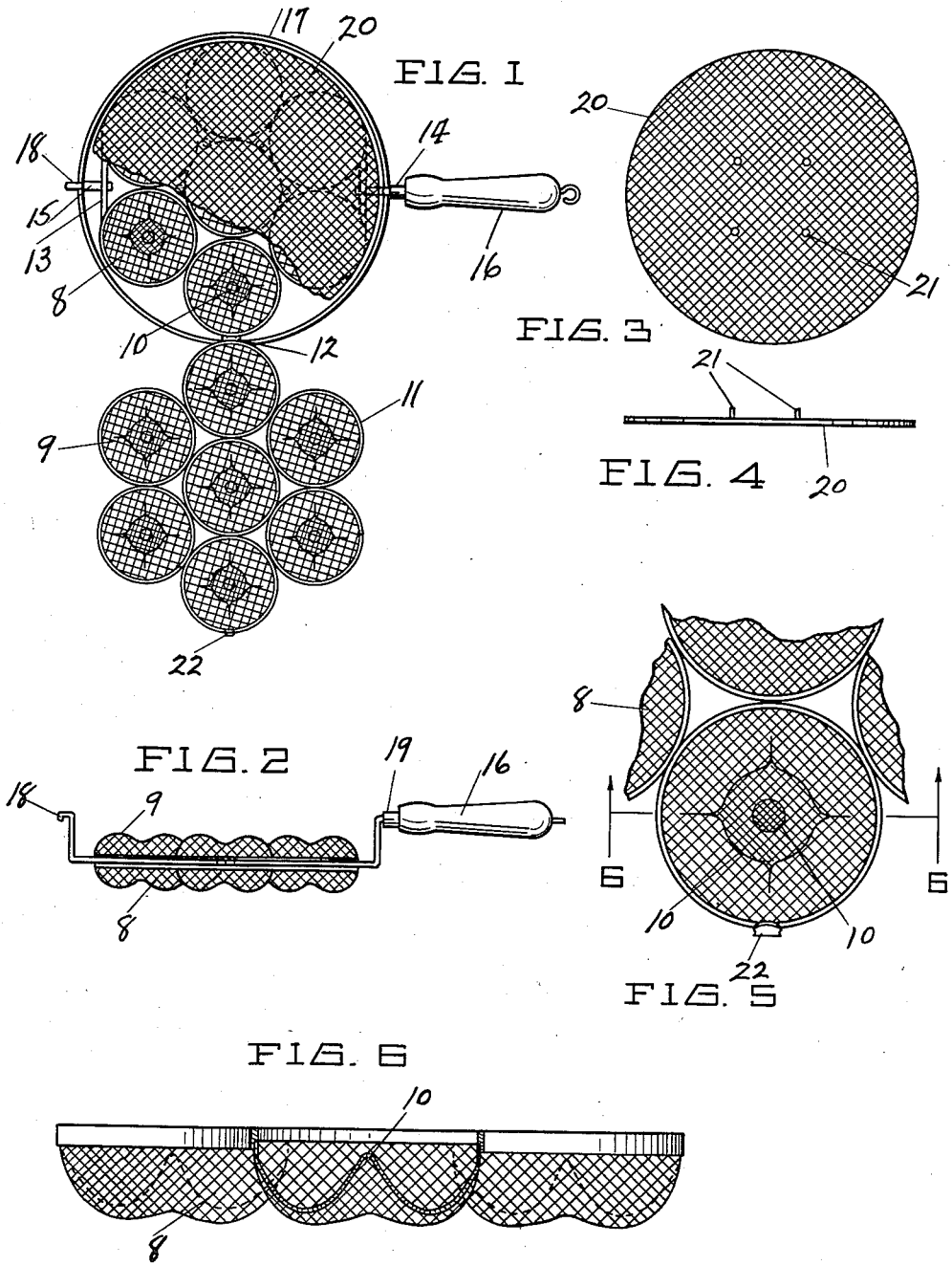

2,013,337

UNITED STATES PATENT OFFICE 2,013,337

COOKING DEVICE

Ethel Bordás, San Francisco, Calif., assignor of one-half to Frieda Klussmann, San Francisco, Calif.

Application June 4, 1934, Serial No. 728,952

2 Claims. (Cl. 53—7)

The present invention relates generally to improvements in cooking utensils and has particular reference to cooking utensils for the purpose of cooking various edible articles, such as doughnuts and like pastries which are cooked in deep grease.

The principal object of the invention is the provision of a cooking utensil for cooking deep grease pastries such as doughnuts and the like and in which a double layer of pastries may be simultaneously cooked on all sides by the simple expedient of reversing the utensil while immersed in the grease.

Another object of the invention is the provision of a cooking utensil for cooking pastries in which the dough is held between the utensil baskets which baskets are hinged together and employ a dividing screen which separates the distinct sets of pastries while being cooked.

A still further object of the invention is the provision of a compact yet simple utensil of the class disclosed which employs a retaining frame in which the separate baskets are suspended as a unit and in which they may be readily reversed to thoroughly cook all portions of the pastries enclosed therein.

An additional object of the invention is that of employing a handy supporting frame for the cages which is also provided with a lifting and reversing handle and that additionally employs means for supporting the same on the upper edge of the cooking utensil holding the cooking grease, thus greatly simplifying the cooking operation.

Ancillary to the foregoing objects is that of providing a pastry cooking utensil that is extremely simple in construction and design and that thoroughly cooks the pastries and also provides an easy and compact means for handling these pastries in considerable numbers.

In the drawing accompanying this application:—

Figure 1 is a plan view showing the utensil arranged in its frame and also including the elements for supporting and reversing the cages or baskets in the operation of cooking the pastries, one section thereof being swung open to disclose the dividing screen thereof;

Figure 2 is a side view of the utensil showing the supporting frame divided basket or cage sections and the lifting and reversing handle thereof;

Figure 3 is a plan view of the dividing screen having retaining lugs arranged thereon;

Figure 4 is an edge view of said dividing screen;

Figure 5 is an enlarged fragmentary plan view further illustrating the basket or cage construction; and Figure 6 is an enlarged elevation partly in section illustrating the basket or cage construction, as indicated by the line 6—6 in Figure 5.

Referring more particularly to the drawing in which the preferred form of the invention is disclosed it will be observed that the cages or baskets, the dividing screen and the supporting frame may be constructed of any well known material such as aluminum or other suitable material that will stand hot grease and heat without the danger of corrosion, and, the mesh of these baskets should be comparatively fine to retain the dough therein when placed in said baskets.

Referring now to Figures 1 and 2 the basket molds 8 and 9 consist of seven molds having central upraised points 10 to form the opening in the pastry, however, any number of these may be employed.

These mold sections are framed as indicated at 11 and the frames are hinged at the point 12, as clearly disclosed in Figure 1.

Additional means 13 and 14 are provided on the section 8 to hold reversing lugs 15 and a lifting and reversing handle 16, all of which are arranged in a frame 17 and employing supporting hooks 18 and the shank 19 of the handle to support the entire device on the utensil for holding the cooking grease, not shown.

The numeral 20 designates a dividing screen having projecting lugs 21 which screen is placed between the mold sections and keeps the pastries in the molds segregated and in their respective baskets while cooking. The lugs 21 enter the mesh of the opposite hinged section to hold the same in place between the basket mold sections.

The operation of cooking pastries with the improved utensil is as follows:—

The mold sections are first released by means of the snap catch 22, Figures 1 and 5, and are swung open as shown in Figure 1. Dough is now inserted in all the molds of the basket mold sections 8 and 9 and the dividing screen 20 is then placed over the mold section 8 and the hinged section 9 is then closed and snapped in place by means of the snap 22 which securely retains both mold sections in place with the dividing screen therebetween.

The utensil is now ready for use and is grasped by the handle 16 and inserted in the hot grease and while the pastries therein are being cooked by the grease the same may be rotated and reversed to cause the even cooking of the pastries contained therein.

It will thus be observed that I have provided a utensil of considerable utility in that a number of pastries may be cooked and handled with the least possible trouble and this utensil also more thoroughly cooks the pastries in less time and with less effort than is possible with methods at present employed in the cooking of these pastries.

Furthermore, an article of this class is much more sanitary than the usual utensil employed in that it may be readily and easily cleansed by dipping in boiling water after it has been used for cooking doughnuts or like pastries.

I claim and desire to secure by Letters Patent of the United States the following:—

1. In a pastry utensil of the class described, a pair of basket frames arranged in hinged relation, a plurality of distinct baskets arranged therein, a porous partition insertable between said frames and providing, distinct pastry cooking sections, means for holding said frames in locked relation, and means for supporting said frames as a unit comprising an upbent handle and a hook section whereby the same may be reversed.

2. In a pastry utensil of the class described, a pair of hinged screen sections embodying frames including a plurality of individual baskets providing cooking molds, a screen partition insertable between said sections to segregate the basket sections, means for holding said sections together as a unit, means for retaining the basket sections in cooking position comprising an upbent handle and a hook section, and means whereby the same may be reversed from side to side during the cooking operation.

ETHEL BORDÁS.